Sept. 22, 1959     H. NECTOUX     2,905,056
FEEDER DEVICE FOR THE AUTOMATIC LOADING OF GUNS
Filed June 6, 1956     7 Sheets-Sheet 1
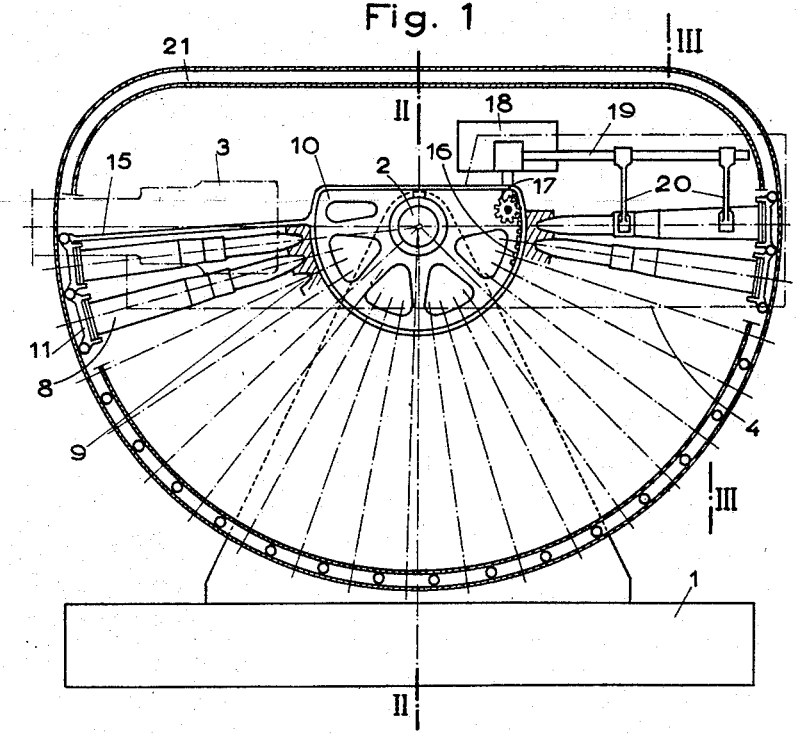
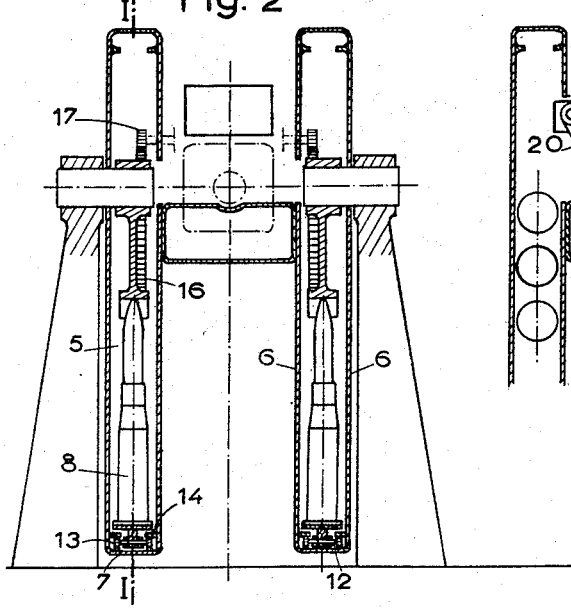
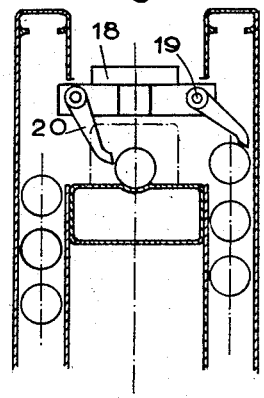
INVENTOR
HENRI NECTOUX
BY Cameron, Kerkam & Sutton
ATTORNEYS Sept. 22, 1959   H. NECTOUX   2,905,056
FEEDER DEVICE FOR THE AUTOMATIC LOADING OF GUNS
Filed June 6, 1956   7 Sheets-Sheet 2

INVENTOR
HENRI NECTOUX
BY Cameron, Kerkam & Sutton
ATTORNEYS

Sept. 22, 1959        H. NECTOUX        2,905,056
FEEDER DEVICE FOR THE AUTOMATIC LOADING OF GUNS
Filed June 6, 1956        7 Sheets-Sheet 3

INVENTOR
HENRI NECTOUX
BY Cameron, Kerkam + Sutton
ATTORNEYS

Sept. 22, 1959    H. NECTOUX    2,905,056
FEEDER DEVICE FOR THE AUTOMATIC LOADING OF GUNS
Filed June 6, 1956    7 Sheets-Sheet 4

INVENTOR
HENRI NECTOUX
BY Cameron, Kerkam & Sutton
ATTORNEYS

Sept. 22, 1959   H. NECTOUX   2,905,056
FEEDER DEVICE FOR THE AUTOMATIC LOADING OF GUNS
Filed June 6, 1956   7 Sheets-Sheet 5

INVENTOR
HENRI NECTOUX
BY Cameron, Kerkam & Sutton
ATTORNEYS

Sept. 22, 1959          H. NECTOUX          2,905,056
FEEDER DEVICE FOR THE AUTOMATIC LOADING OF GUNS
Filed June 6, 1956          7 Sheets-Sheet 6
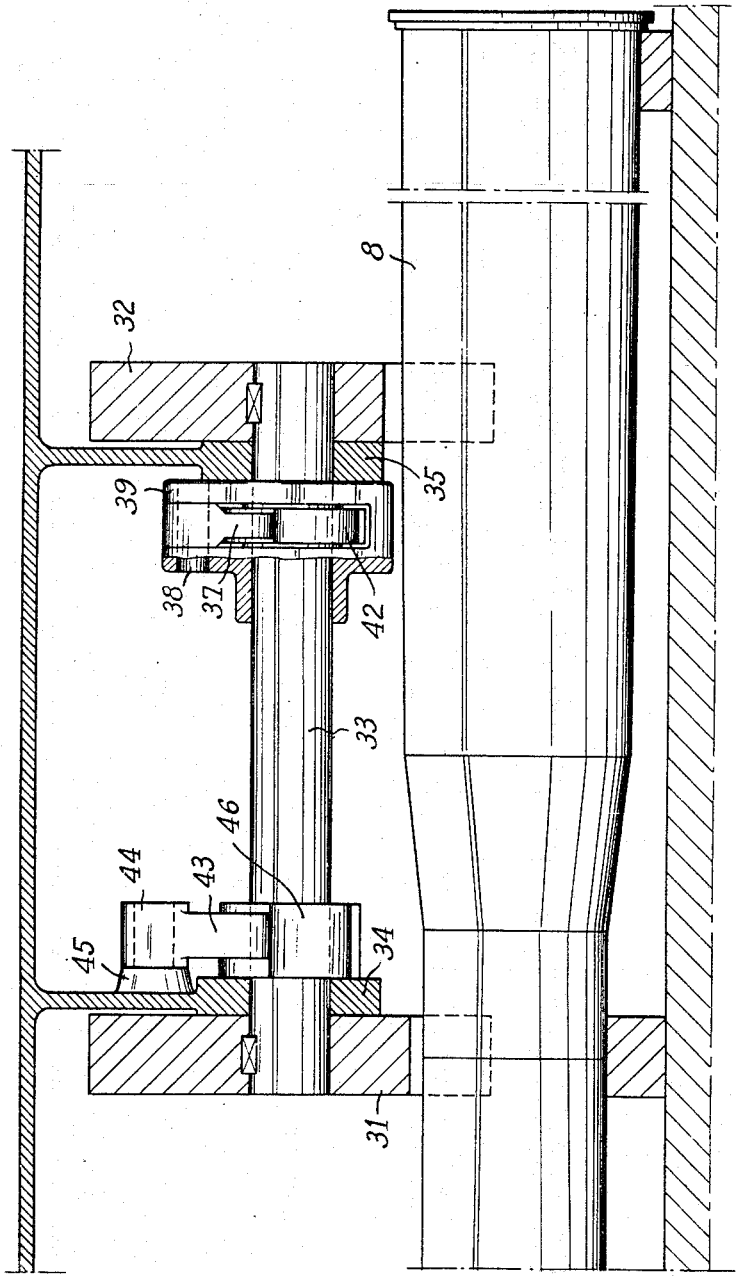
INVENTOR
HENRI NECTOUX
BY Cameron, Kerkam & Sutton
ATTORNEYS

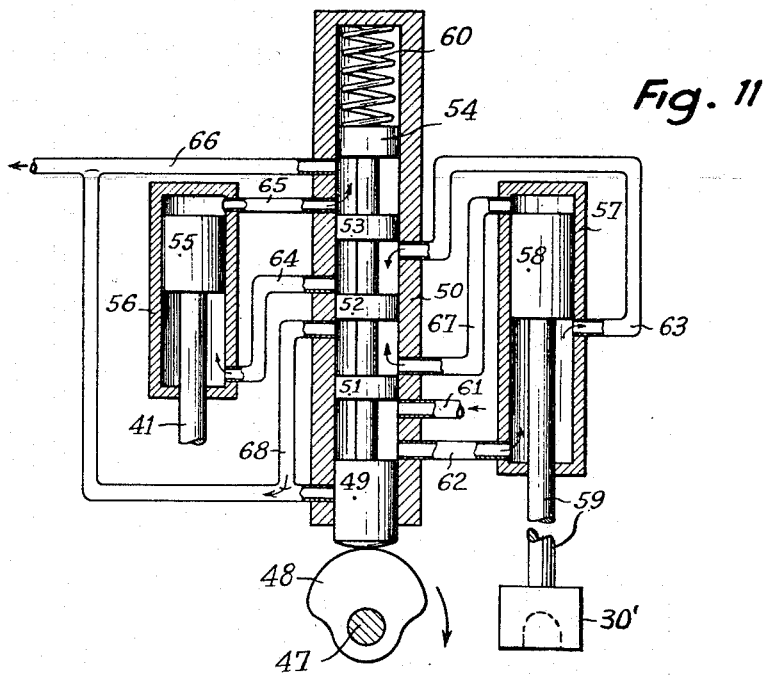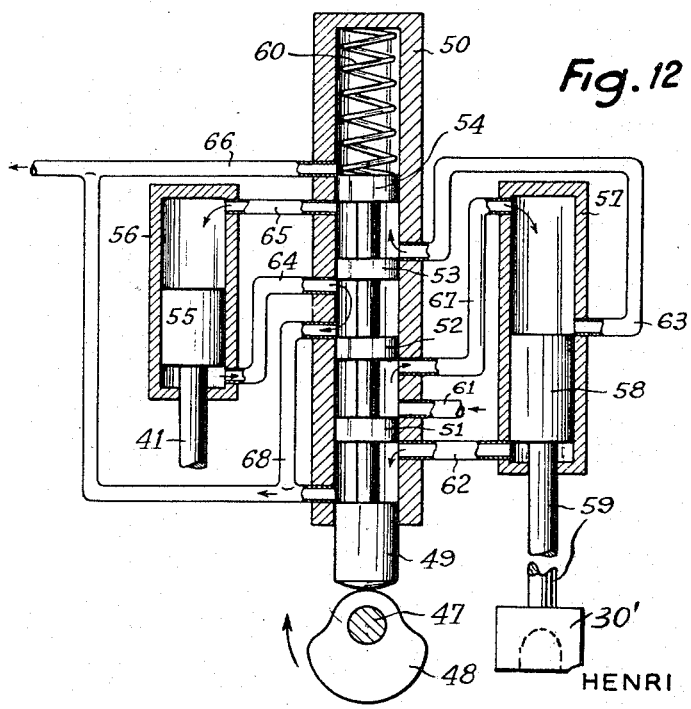

United States Patent Office 2,905,056
Patented Sept. 22, 1959

2,905,056
FEEDER DEVICE FOR THE AUTOMATIC LOADING OF GUNS

Henri Nectoux, Saint-Germain-en-Laye, France, assignor to Societe des Forges et Ateliers du Creusot, Paris, France Application June 6, 1956, Serial No. 589,760

Claims priority, application France December 8, 1955

6 Claims. (Cl. 89—33)

The present invention relates to feeder device, for the automatic loading of guns, having a continuous displacement during firing, a device which is more particularly designed for eliminating, when the rate of firing is high, the considerable inertia produced by the periodical and successive forward movements of the assembly of ammunition fed into the loading device as well as by the very rapid to-and-fro movements imparted to the members which control this forward movement, all these movements being effected in the time interval which separates two consecutive shots.

According to the invention the shells or cartridges are contained in magazines of circular or substantially circular shape disposed in vertical planes on both sides of the oscillating mass co-axially to the trunnions and taking part in the movements of laying the elevation of the gun. In each of the magazines the shells or cartridges are supported on the one hand by a platform of circular or substantially circular shape co-axial to the trunnion on which it is mounted idly, and provided on its circumference with a plurality of recesses in each of which the ogival point of a projectile may be lodged, and on the other hand by a plurality of carriages each capable of receiving the base of a shell or cartridge, the said carriages being connected to one another in the form of an articulated belt adapted to move along a roller path provided on the internal periphery of the magazine. During the aiming movements the magazines and the members maintaining the shells or cartridges in position which they contain move in bulk with the oscillating mass. For the feed the belt of carriages and the recessed platform, which are connected to one another by means of an arm arranged on a radius of the magazine are carried along, in unison with one another, about the corresponding trunnion by means of a single motor common to the assembly of magazines and mounted on the oscillating mass, the general arrangement being such that during the period of firing a displacement movement is imparted to the assembly of shells or cartridges contained in the magazines which movement brings successively each shell or cartridge in to the position from which it is transported laterally towards the axis of the gun by means of a lateral transport mechanism control by the feeder drive.

In the accompanying drawings various embodiments of a feeder device according to the invention are illustrated diagrammatically, and will be described hereinafter by way of example. In the drawings:

Figure 1 shows in elevation a longitudinal section of one of the magazines on the line I—I of Figure 2, the gun being in a horizontal position.

Figure 2 is a cross section through the axis of the trunnions on the line II—II of Figure 1.

Figure 3 is a partial cross section through the rear of the magazines on the line III—III of Figure 1.

Figure 10 is a section on the line X—X of Figure 8.

Figure 11 is a diagrammatic view of a hydraulic device for the drive of the transport of a shell or cartridge.

Figure 12 shows the device according to Figure 11 after the transport of the shell or cartridge.

Figure 4:
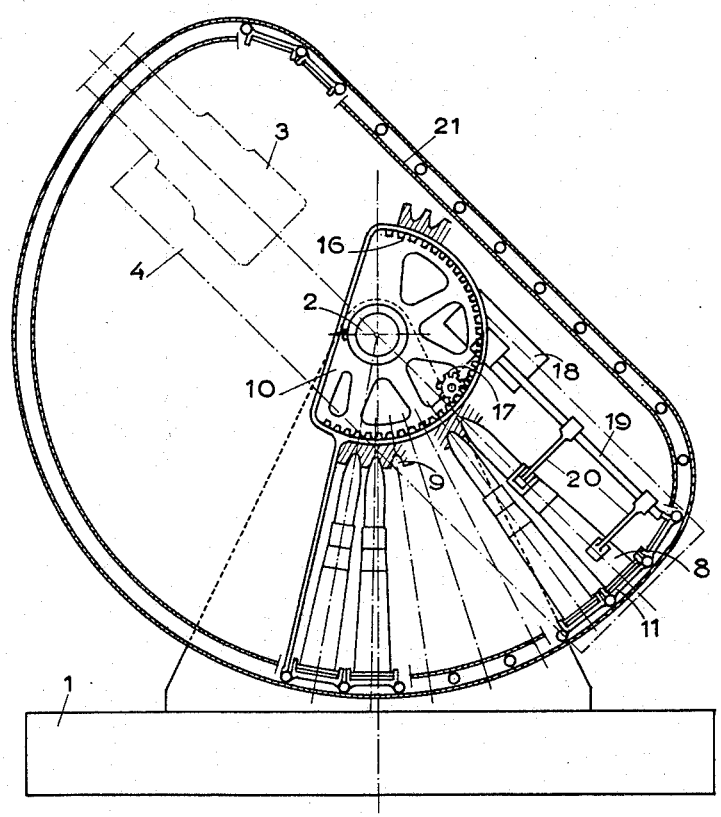
Figure 4 is a longitudinal section in elevation of one of the magazines, similar to Figure 1, but the gun being elevated at an angle of approximately 45°, and the magazine being already partly exhausted.

In the drawing 1 designates the carriage of the artillery piece the trunnions 2 of which support the oscillating mass composed of the breech 3 and of the frame 4.

Two magazines 5 are fixed on both sides of the frame 4, co-axially to the trunnion 2 and taking part in the movements of laying the gun in elevation.

Each of the magazines 5 which are given only a semi-circular form in order to save weight and space, is constituted substantially of two semi-circular webs 6 connected to one another at their periphery by a sheet metal piece 7.

The points of a plurality of cartridges 8 disposed fan-shape in this magazine are engaged in recesses 9 provided on the periphery of a platform 10 mounted idly on the trunnion 2, whereas the corresponding bases of the shells or cartridges rest on carriages 11 each of which is connected to the adjacent one by a common articulation pin 12 at the ends of which there are mounted two rollers 13 which engage between the bottom 7 and rails 14 serving as their guides.

The articulated belt constituted by the carriages 11 is fixedly connected to the platform 10 by means of an arm 15 attached to the last carriage.

The two platforms 10 are provided with toothed sectors 16 each of which meshes with a spur gear pinion 17, the two pinions being driven simultaneously by a motor 18, for example an electric motor, mounted above the frame 4.

The motor 18 is automatically set in motion at the beginning of a firing, and comes automatically to a standstill after firing.

During the run of the motor, the shells or cartridges are carried along both by the platforms 10 and by the carriages 11, and assume for each one of the said magazines successively an intermediate position in which their axis is preferably parallel to the axis of the breech.

From this intermediate position which can only be occupied during an infinitesimal fraction of time, the shells or cartridges are moved into alignment with the breeches (where they are caught by the usual loading means) by the aid of a mechanism which comprises for example for each of the magazines a shaft 19 carrying two arms 20 and driven periodically by the motor 18.

Figure 3 shows the position of the arms 20 associated with the right magazine at the moment when the first shell or cartridge in this magazine arrives at the intermediate position and the position of arms 20 of the left magazine at the moment when a shell or cartridge from the left magazine has been moved into alignment with the breech.

Figure 3 shows also that the cartridges contained in one of the two magazines are angularly offset with respect to those of the other magazine, this offset being equal to half the angle included between the adjacent cartridges of the same magazine.

During firing it suffices accordingly that the advance of the assembly of shells or cartridges during the time interval which separates two consecutive firings corresponds to the angular offset as stated above.

Owing to the continuous slow velocity imparted to the assembly of shells or cartridges in the magazines the effect of inertia is reduced, even with increased rate of fire, to the inertia resulting from the transfer of a single shell or cartridge from the magazine towards the axis of the breech.

After having passed through the intermediate position in which the carriages 11 are disengaged from the shells or cartridges they had supported, these carriages engage themselves with their rollers 13 above the rails 21 provided in the upper portion of each magazine (Figure 4).

When a magazine is partly or totally empty, the recharging is effected by moving the train of carriages step by step in the reverse direction either by the motor, or by hand after having declutched the motor, the shells or cartridges being then inserted one after the other through a lateral window arranged in the magazine, preferably in the neighbourhood of the intermediate position as defined hereinabove.

Figure 5:
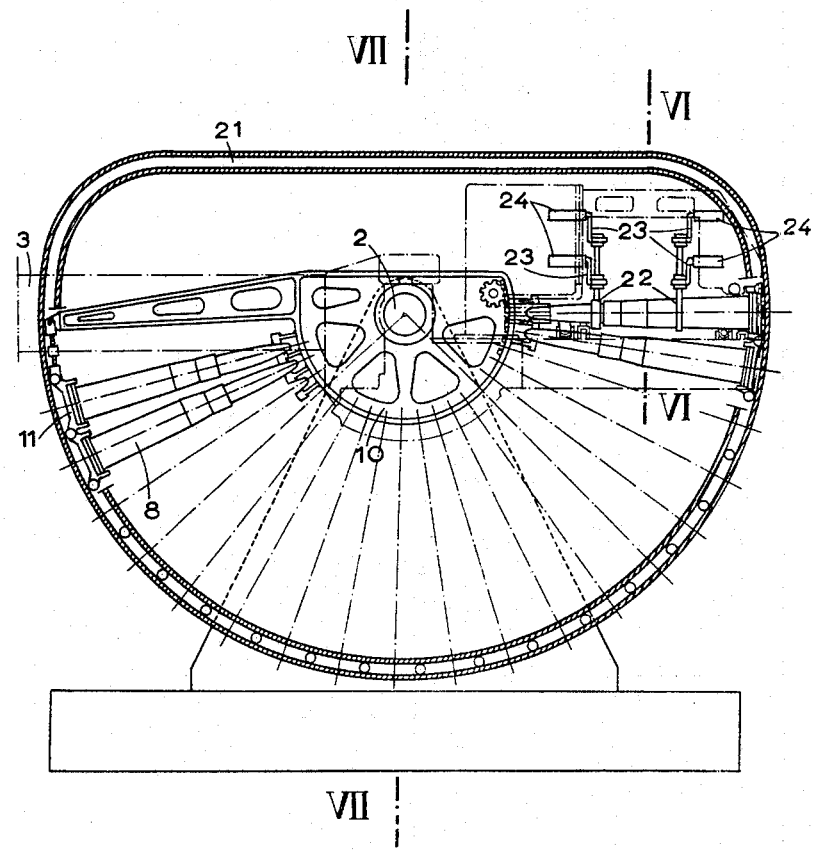
Figure 5 is a view similar to that of Figure 1 showing a first modification of the lateral transport mechanism.
Figure 6:
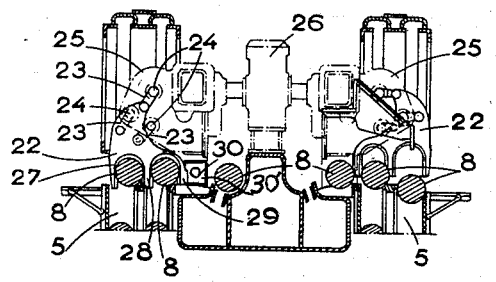
Figure 6 is a section on line VI—VI of Figure 5.
Figure 7:
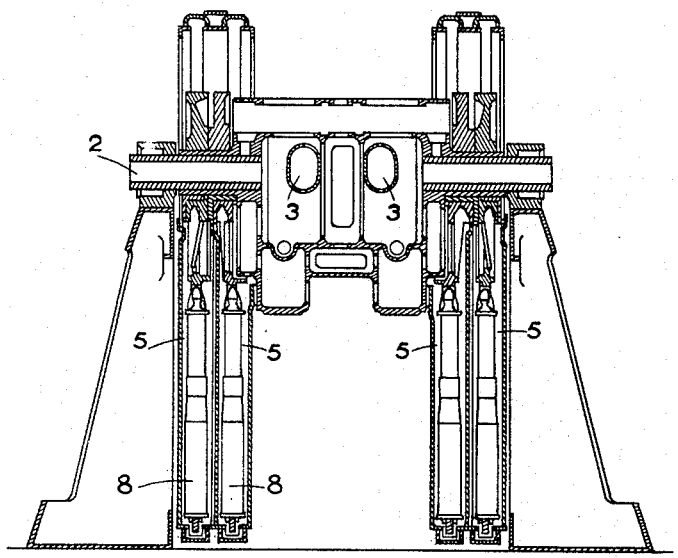
Figure 7 is a section on line VII—VII of Figure 5.

The modification of the lateral transporting mechanism of a shell or cartridge illustrated in Figures 5 and 6 permits on the one hand to obviate the alternating movement of the oscillating arms which move in search of the shells or cartridges in the magazine in order to move the same into alignment with the axis of the barrel, and on the other hand to arrest each shell or cartridge in an intermediate position between the magazine and the barrel, this modification being applicable moreover to a gun having two barrels 3 of which each is supplied by two magazines 5 as illustrated in Figure 7.

The transport of the shells or cartridges is then effected by rakes 22 which carry out only translation movements and can seize the shells or cartridges only along the path leading from the magazines to the barrels. These rakes are carried along by connecting links 23 pivoted about axes 24. In order to assure a good guidance of the rakes three links 23 per rake are provided as shown in Figure 6. Each rake is accordingly carried along in translation in such a manner that it may displace one shell or cartridge during the course of its approach to the barrel, and it moves away from the path of the shells or cartridges when coming back towards the magazine. There is accordingly no alternating movement, but a movement of each rake carried out in the same sense of rotation of the links 23.

These links are driven from gear boxes 25 receiving their movement from a transmission or from a motor 26.

In the case of a double-barrelled gun having four magazines and when it is desired to bring the shell or cartridge to be loaded to a standstill in an intermediate position where there is a fuze-setter, it is important to provide members temporarily arresting the rake before the intermediate position.

Special arrester teeth may be provided for this purpose disposed in the gear boxes 25. Though the drive by the transmission or motor 26 is continuous, the arrester teeth of the gear boxes 25 assured temporarily interrupted rotation of the connecting links 23 in order to arrest the rakes in such a manner that the shells or cartridges come successively to a standstill at the intermediate positions, in order to set the fuze.

On the left hand side of Figure 6 the rake 22 is illustrated in the position in which it has gripped a shell or cartridge 8 coming from the magazine 5 situated on the outside of the gun, this shell or cartridge 8 being carried along by the rake 22 between the teeth 27 and 28 in the direction of the barrel. The rake 22 carries along the shells or cartridges above the second magazine, that is to say the magazine situated nearest to the barrel. During this time the shell or cartridge 8 which is already gripped between the teeth 28 and 29 of the rake, is moved into the intermediary position 30 where it can be subject to the action of the fuze-setter 30'.

After the displacement of the shells or cartridges 8 from the outer magazine towards the inner one, and of the latter towards the fuze-setter the rake 22 continues its movement, and moves away upwardly, abandoning the shells or cartridges which had just been displaced in order to come back and seize a new shell or cartridge from the outer magazine.

During the approach movement described hereinabove of the shells or cartridges 8 towards the barrel, the tooth 29 of the rake has pushed the shell or cartridge, which had already been subject to the action of the fuze-setter 30', towards the axis of the barrel. The arrival of the shell or cartridge in the axis of the barrel starts in the usual manner the loading action which carries the shell or cartridge into the barrel.

The right hand side of Figure 6 illustrates one shell or cartridge 8 of the outer magazine on the point of rising towards the rake 22; one shell or cartridge 8 coming from the outer magazine being temporarily arrested above the inner magazine, and one shell or cartridge 8 in position 30 in front of the fuze-setter 30'. The right hand side of Figure 6 illustrates accordingly the rake 22 during one of its temporary moments of rest.

It will be understood that Figure 6 illustrates a case in which the two barrels are loaded, and fired, in succession. The functioning of the rakes 22 are therefore offset as illustrated in the drawing, one shell or cartridge being in front of the fuze-setter 30' (on the right) while another shell or cartridge (on the left) is in alignment with the barrel, ready for loading.

Figure 8:
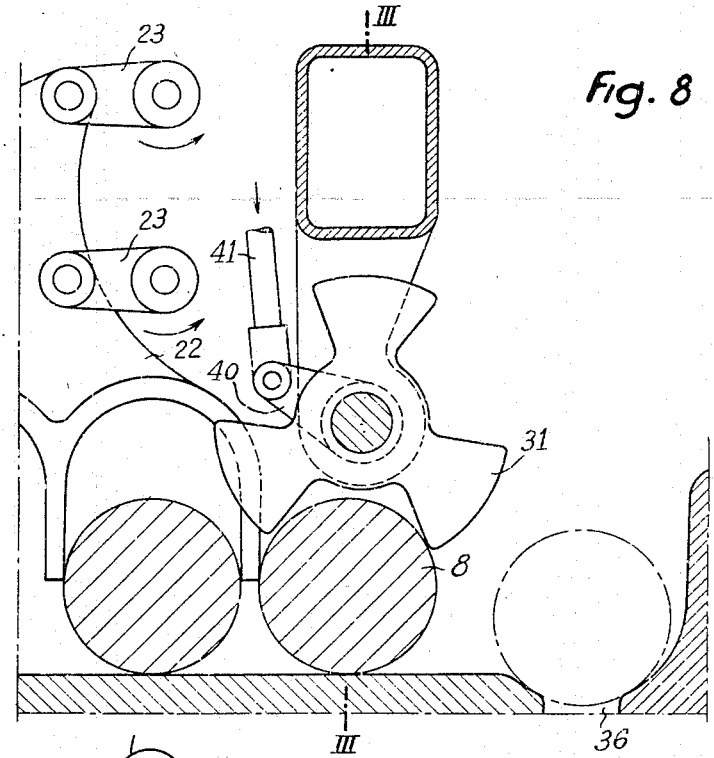
Figure 8 is a section perpendicular to the axis of the left hand side barrel of a two-barrelled gun, showing a second modification of the lateral transport mechanism.
Figure 9:
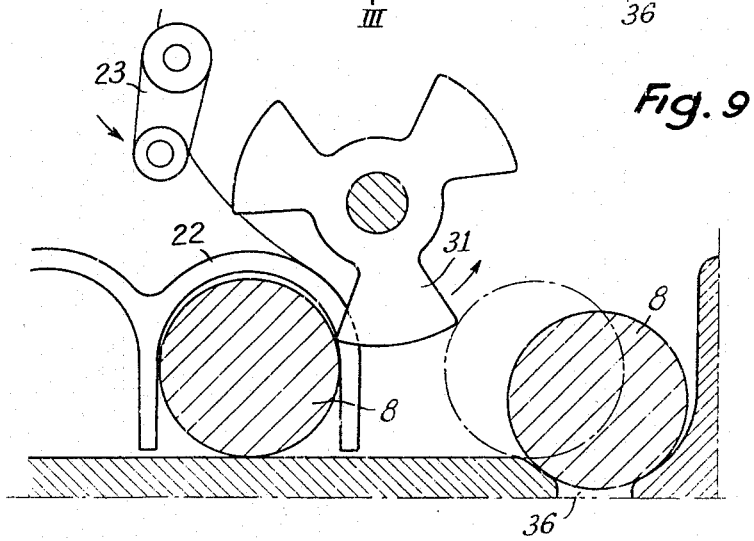
Figure 9 is a section similar to that shown in Figure 8, showing a shell or cartridge in the course of transport towards the axis of the barrel.

The second alternative of the mechanism for the lateral transport, as illustrated in the Figures 8, 9 and 10, allows the shells or cartridges to be displaced at a higher speed between the last intermediate position and the axis of the barrel than between the magazine and this intermediate position.

For this purpose the rake 22, driven by the cranks 23, moves the shells or cartridges just into the intermediate position 30 where they are subject to the action of the fuze-setter 30'. Above this position there are co-axially arranged two three-pronged stars 31 and 32, which are keyed to a shaft 33 journalled in bearings 34 and 35 (Figure 10).

Figure 9 shows these stars at the moment when one shell or cartridge approaches the intermediate position. This shell or cartridge, abutting on the lower prong of the stars, rotates the latter to the position illustrated in Figure 8, where it becomes immobilized in front of the fuze-setter 30'.

As soon as the setting of the fuze is terminated, a driving member acts on the stars 31 and 32 in order to turn them from the position shown in Figure 8 into the position illustrated in Figure 9. This movement ejects the shell or cartridge towards the axis of the barrel.

In the course of the cycle described briefly hereinabove the stars perform one third of a revolution. This movement is in two parts: during the first one the shell or cartridge rotates the stars, while during the second the stars eject the shell or cartridge.

The mechanism which transmits to the stars the movement imparted by the driving member comprises a pawl 37 pivoted on an axle 38 mounted on a sleeve 39 turning on the shaft 33.

The sleeve is integral with a crank 40 actuated by a connecting rod 41. A wheel 42 keyed on the shaft 33 has six recesses into which the pawl 37 drops in succession.

At the end of the fuze-setting the stars are in the position illustrated in Figure 8, in which the connecting rod 41 moves pawl 37 and wheel 42, and rotates the stars through a sixth of a revolution. The same continue their movement owing to inertia, which forces the pawl 37 to disengage from its recess. The stars come to a standstill when the pawl 37 drops into the next recess. They are then in the position illustrated in Figure 9.

The arrival of the subsequent shell or cartridge pushed by the rake makes the stars turn from the position indicated in Figure 9 into the position indicated in Figure 8. As soon as this position is attained, the action of the fuze-setter 30' starts the upward movement of the connecting rod 41, carrying along the pawl 37 which drops into a new recess, and the cycle is ready to begin again.

When the connecting rod 41 rises again the pawl 37 might rotate wheel 42 by friction in a retrograde movement. This difficulty is obviated by a secondary pawl 43 mounted on an axle 44 which is fixed to the frame 45. The pawl 43 prevents the return movement of a ratchet wheel 46 having three teeth keyed to a shaft 33 in such a manner that locking is effected when the shell or cartridge has arrived in front of the fuze-setter 30'.

The Figures 11 and 12 show a hydraulic device forming a driving member, owing to which the movements of the connecting rod 41 are controlled by those of the fuze-setter 30', and the movements of the fuze-setter 30' are controlled by those of the cranks 23 which act on the rake 22.

The driving shaft of the cranks 23 is coupled to a shaft 47 carrying a cam 48. This cam 48 determines the movement of the slide valve 49 of a hydraulic distributor 50. This slide valve comprises a series of "lands" 51, 52, 53 and 54.

The connecting rod 41 is driven by a piston 55 which moves in a cylinder 56.

The Figures 11 and 12 show also a cylinder 57 wherein moves a piston 58 which drives the fuze-setter 30' through rod 59.

A spring 60 biases the slide valve of the distributor towards the cam 48.

The various ducts of the hydraulic distributor will be explained hereinafter with reference to the manner of functioning of this distributor.

The hydraulic fluid under pressure enters into the distributor through a duct 61. In the case of Figure 11 which shows the fuze-setter in retracted position, the stars 31 and 32 are in the position illustrated in Figure 8 and the duct 61 opens below the "land" 51. The pressure fluid then takes a duct 62 in order to enter the cylinder 57 below the piston 58. It can leave the cylinder 57 through a duct 63 in order to enter the distributor below the "land" 53, and may take a duct 64 opening below the piston 55 into the cylinder 56.

The chambers of the cylinders 56 and 57 situated above the pistons 55 and 58 are in communication with the drain through the ducts 65, 66, 67 and 68, respectively. The pressure of the liquid acts on the piston 58 in such a manner as to maintain the fuze-setter in the position where it caps the shell or cartridge, and it acts on the piston 55 in such a manner that it maintains the connecting rod 41 in the upper position.

The movement of the rake 22 rotates shaft 47 of the cam 48. The slide valve 49 of the distributor then descends to the position illustrated in Figure 12. In this position the chambers of the cylinders 56 and 57 situated below the pistons 55 and 58 are connected to drain, one through the duct 64 and the other through the duct 62. At the same time the chambers of the cylinders 56 and 57 situated below the pistons 55 and 58 are supplied with liquid under pressure by the ducts 63 and 65 for one, and 67 for the other.

The piston 58 controlling the fuze-setter 30' for uncapping the shell or cartridge is actuated first. The piston 55 controlling the movement of the stars 31 and 32 is only actuated subsequently, as soon as the orifice of the duct 63 in the cylinder 57 is uncovered by the piston 58. It is essential, that the ejection movement take place after the uncapping of the cartridge.

The movement of the cam 48 returns the slide valve 49 to its initial position which causes the return of the piston 58 then the return of the piston 55, restoring the connecting rod 41 to its upper position, and the cycle is completed.

The rotation of the stars 31 and 32 is abrupt, in such a manner that the shell or cartridge is rapidly ejected towards the corresponding barrel. The loader then throws the shell or cartridge into the yoke, and the triggering of the shot can be effected.

The device described hereinabove increases to a substantial degree the rate of firing owing to the fact that the shells or cartridges leaving the intermediate position where the fuze-setter acts, are replaced much more rapidly than they would be by the action of the rake 22 only.

It will be understood that the invention is not limited to the embodiments described hereinabove and illustrated in the drawings. The same may undergo modifications of detail without departing from the scope of the invention as defined by the appended claims.

What I claim is:

1. In a feeder for automatic guns including a vertical magazine of circular shape coaxial with adjacent trunnions of the gun on each side of the gun and rotating with the gun in elevation, a platform of circular shape in each magazine mounted for rotation on the adjacent trunnion, recesses in the periphery of said platform each receiving the point of a projectile, an electric motor mounted on the gun rotating said platform in slow continuous movement independent of the movement of the gun, a track within said magazine adjacent its outer periphery and parallel to the periphery of said platform, articulated carriages mounted in said track each carriage receiving the base of a shell, an arm extending radially from said platform and engaging the carriage of the last shell in the magazine for moving all shells in the magazine simultaneously and means driven by said motor for moving each shell successively laterally through at least one intermediate arrested position from the magazine into the axis of the gun.

2. In a feeder for automatic guns including a vertical magazine of circular shape coaxial with the adjacent trunnion of the gun on each side of the gun and rotating with the gun in elevation, a platform in each magazine mounted for rotation on the adjacent trunnion and receiving the shells, a motor for moving said platform in continuous movement for moving all shells in the magazine simultaneously and means for moving each shell successively laterally to at least one intermediate arrested position from the magazine into the axis of the gun, said means for moving each shell laterally including a rake, shell receiving teeth formed in said rake receiving a shell for each arrested position the shell occupies between the magazine and the axis of the gun and rotary linkage rotated by said motor moving said rake linearly in engagement with the shells and then lifting said rake out of engagement with the shells.

3. A feeder as described in claim 2 including means for receiving the shell from an intermediate arrested position and for moving the shell toward the axis of the gun comprising rotary shell receiving members rotating on an axis parallel to the axis of the shell and periodically rotated in timed relationship to the movement of said brake.

4. A feeder as described in claim 3 including a fuze-setter, a hydraulic pressure circuit, a piston in said circuit for moving said fuze-setter, a second piston in said circuit imparting periodic rotary motion to said rotary shell receiving members and valve means in said circuit actuated by the movement of said rake for controlling the movement of said pistons.

5. In a feeder for automatic guns including a pair of vertically disposed circularly shaped magazines coaxial with the adjacent trunnion of the gun on each side of the gun and rotating with the gun in elevation, a platform of circular shape in each magazine mounted for rotation on the adjacent trunnion, recesses in the periphery of each of said platforms each receiving the point of a projectile, a motor mounted on the gun rotating said platforms in slow continuous movement independent of the movement of the guns, a track within each of said magazines adjacent its outer periphery and parallel to the periphery of the adjacent platform, articulated carriages mounted in each of said tracks each carriage receiving the base of a shell, an arm extending radially from each platform and engaging the adjacent carriage of the last shell in the magazine for moving all shells in the magazine simultaneously and means for moving shells alternately from each magazine of a pair of magazines laterally into the axis of the gun.

6. In a feeder for a pair of alternately firing automatic guns, a pair of vertically disposed circularly shaped magazines coaxial with the adjacent trunnion of the guns on each side of the pair of guns and rotating with the guns in elevation, a platform of circular shape in each magazine mounted for rotation on the adjacent trunnion, recesses in the periphery of each platform each receiving the point of a projectile, a motor mounted on the guns rotating said platforms in slow and continuous movement independent of the movement of the guns, a track within each of said magazines adjacent its outer periphery and parallel to the periphery of the adjacent platform, articulated carriages mounted in each of said tracks each carriage receiving the base of a shell, an arm extending radially from each platform and engaging the adjacent carriage of the last shell in the magazine for moving all shells in the magazine simultaneously, and means for moving a shell from an alternately selected magazine of a pair of magazines laterally to the adjacent gun the simultaneous movement of all shells in the non-selected magazine being stopped during lateral movement of the selected shell.

References Cited in the file of this patent

UNITED STATES PATENTS

| | | |
|---|---|---|
| 1,293,396 | Fox | Feb. 4, 1919 |
| 1,441,535 | Morse | Jan. 9, 1923 |
| 1,867,513 | Lahti | July 12, 1932 |
| 2,524,132 | Naugler | Oct. 3, 1950 |

FOREIGN PATENTS

| | | |
|---|---|---|
| 966,693 | France | Mar. 8, 1950 |